Jan. 31, 1939.   A. BISAILLON ET AL   2,145,414
SAFETY AIRPLANE
Filed March 20, 1937   2 Sheets-Sheet 2
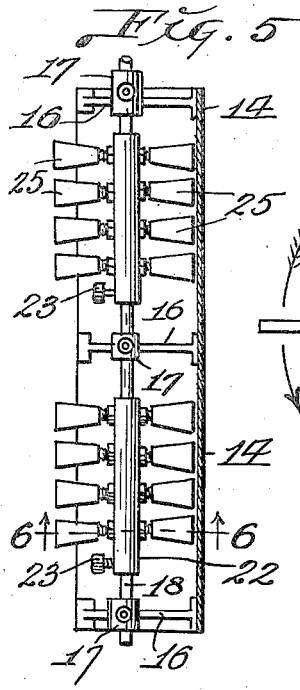
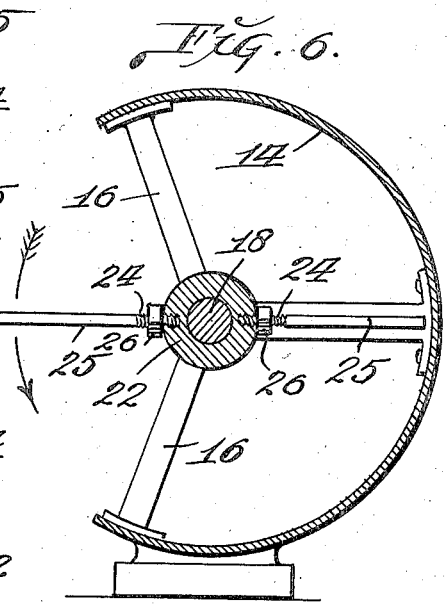
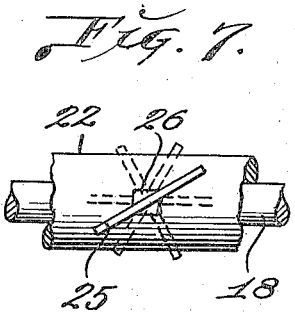
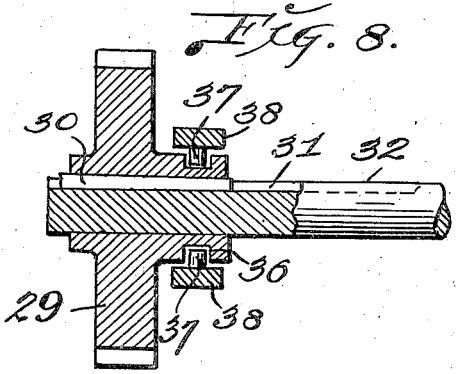
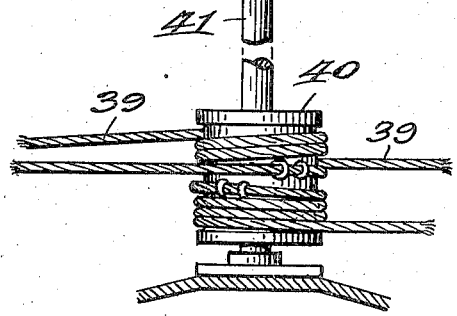
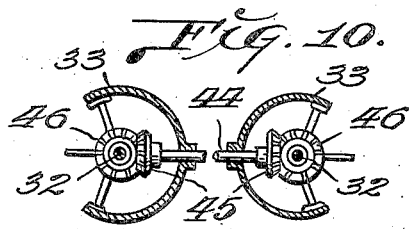
INVENTORS,
ALEXIS BISAILLON AND
GEORGE E. BISAILLON.
By Martin P. Smith ATTY.

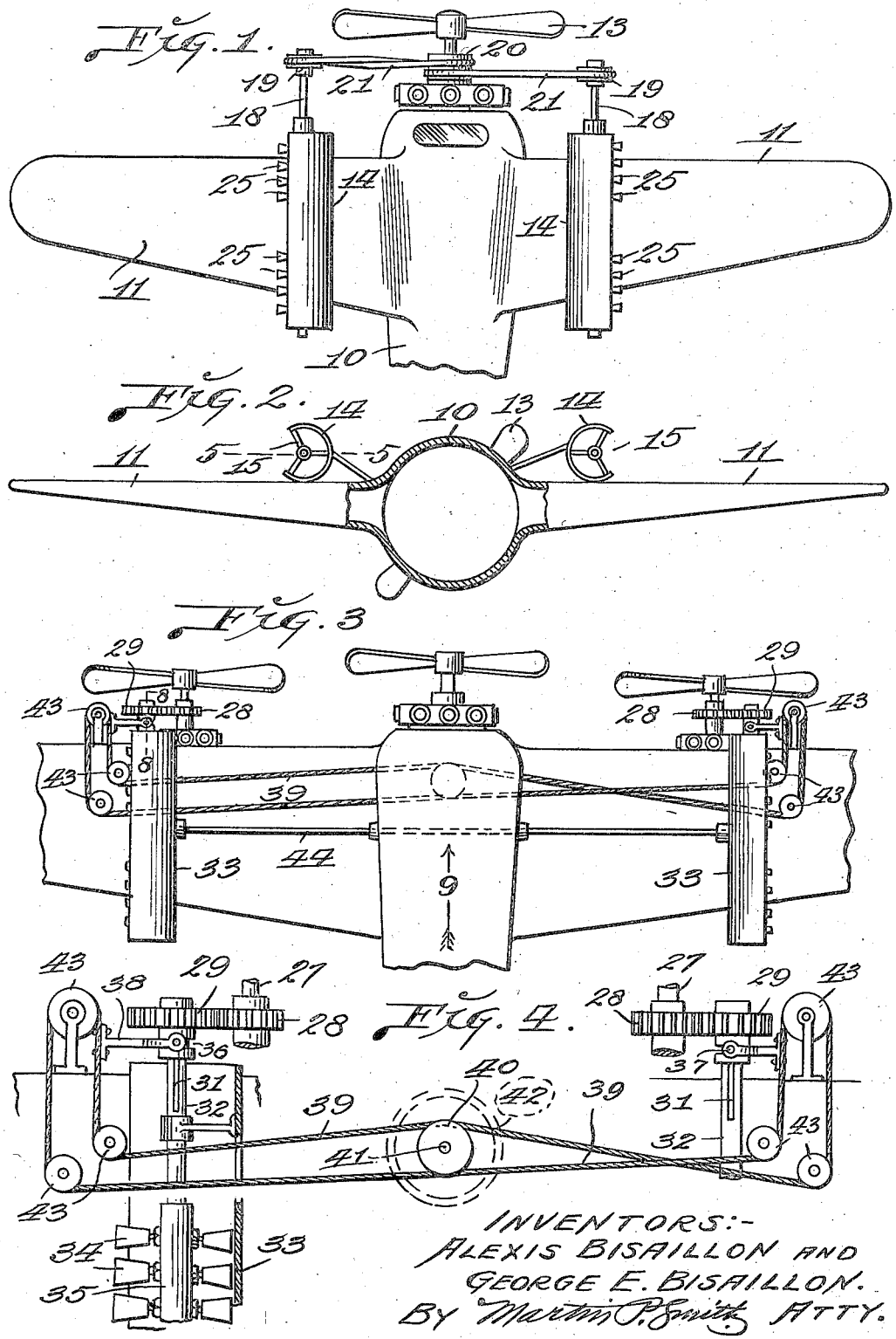

Patented Jan. 31, 1939

2,145,414

UNITED STATES PATENT OFFICE 2,145,414

SAFETY AIRPLANE

Alexis Bisaillon, Los Angeles, and George E. Bisaillon, Long Beach, Calif.

Application March 20, 1937, Serial No. 132,122

5 Claims. (Cl. 244—9)

Our invention relates to a safety air plane and has for its principal objects, to generally improve upon the existing forms of air planes and to mount on the wings or the fuselage of an air plane, equipment which, in operation, provides a marked degree of safety for the plane and its occupants, particularly while the plane is taking off or leaving the ground, while landing and also, while flying through fog or heavy clouds.

Further objects of our invention are to provide relatively simple and efficient safety equipment for air planes that will materially increase the speed of the equipped plane above the normal speed attained by the plane when driven by its engine or engines, and further, to provide safety attachments that may be utilized for maintaining the ship in perfect balance fore and aft while the plane is in sustained flight.

A further object of our invention is to provide air plane safety equipment that will enable the plane to take off or alight within limited areas, for instances, on the flat roofs of buildings, such as post offices, railway stations, and the like, or upon comparatively small areas of the ground.

With the foregoing and other objects in view, our invention consists in certain novel features of construction and arrangements of parts that will be hereinafter more fully described, claimed and illustrated in the accompanying drawings, in which:

Fig. 1 is a plan view of an air plane having a single propeller at the forward end of the fuselage, and which plane is equipped with our improved safety apparatus.

Fig. 2 is a rear elevational view of the form of plane illustrated in Fig. 1 and with the fuselage in vertical section.

Fig. 3 is a plan view of a plane having three propellers and which is equipped with our improved safety apparatus.

Fig. 4 is a plan view of the means utilized for drawing the safety apparatus into and out of operative engagement with the propeller shafts of the plane.

Fig. 5 is an enlarged horizontal section taken on the line 5—5 of Fig. 2.

Fig. 6 is an enlarged cross section taken on the line 6—6 of Fig. 5.

Fig. 7 is an elevational view of a portion of an adjustable sleeve that carries one or more sets of adjustable blades.

Fig. 8 is an enlarged detail section taken on the line 8—8 of Fig. 3.

Fig. 9 is an enlarged elevational view taken, looking in the direction indicated by the arrow 9 in Fig. 3.

Fig. 10 is a detail view of the operating connections between the blade carrying shafts of the safety appliance.

Referring by numerals to the accompanying drawings, and particularly to the construction illustrated in Figs. 1 and 2, 10 designates the fuselage of an air plane which is equipped with the conventional wings 11 and a single engine or motor 12, at the forward end of the fuselage, carries a propeller 13.

Mounted on top of the wings 11 to the sides of the fuselage are substantially cylindrical housings 14 that occupy positions parallel with the axis of the fuselage and the outer portions of the walls of these housings are cut away for approximately one-third the circumference of the housings, thereby forming openings 15 that extend the full length of said housings, and which openings are approximately 120° in width.

Secured within these housings are frames 16, having bearings 17 for axially disposed shafts 18, the forward ends of which carry pulleys 19. Mounted on the shaft of the engine are two pulleys 20 that are connected respectively with the pulleys 19 by belts 21, one of which is crossed in order that the shafts 18 may be simultaneously driven in opposite directions. If desired, the driving connections between the engine shaft and the shafts 18 may take the form of shafts having beveled gear connections with the engine shaft and with the shafts 18.

Mounted for adjustment on each shaft 18 between its center and the ends of the housings 14 are sleeves 22 that are secured to the shaft in their adjusted positions by set screws 23.

Screw seated in each sleeve, preferably at diametrically arranged points, are the threaded stems 24 that are formed on the inner ends of blades 25. This connection between the blades and the sleeves enables the blades to be shifted into various angular positions as illustrated in Fig. 7 and after such adjustment the blades may be secured by tightening lock nuts 26 against the outer face of the sleeve and which lock nuts are carried by the threaded stems 24. (See Figs. 6 and 7.)

The length of the blades 25 is such that their outer ends travel in paths adjacent the inner surface of the housings 14 and thus in passing across the longitudinal disposed opening 15 in the housings, the blades impinge on the air along the outer sides of the housings, for approximately one-third its circumference and this action produces a marked lifting effect on the equipped plane.

By adjusting the blades into inclined positions relative to the horizontal plane occupied by the axis of shaft 18, the blades in operation will, in addition to producing a lifting effect, act to push and drive the equipped plane forwardly. Obviously, this pushing effect materially increases the normal speed of the plane.

A conventional clutch may be provided between the engine shaft and the double pulleys 20, thus enabling the driver of the plane to render the blade carrying shafts 18 operative or inoperative as desired.

In the construction illustrated in Figs. 3 and 4, the air plane is equipped with three engine driven propellers, one at the forward end of the fuselage, and the other two on the forward edges of the wings to the sides of the fuselage.

The shafts 27 of the two side propellers carry pinions 28 that mesh with larger pinions 29, the latter carrying splines 30 that are mounted to slide lengthwise in grooves 31 that are formed in shafts 32. These shafts 32 are practically identical with shafts 18 previously described and said shafts 32 extend axially through cylindrical housings 33, that are practically the same as the housings 14.

Each housing 33 is cut away longitudinally on its outer portion for approximately one-third of its circumference to provide openings 34, through which pass the outer portions of the blades 35 that are adjustably mounted on said shafts 32. (See Fig. 4.)

The hub of each gear wheel 29 is provided with a groove 36 into which project studs 37 that are carried by a yoke 38 and the outer ends of these yokes are rigidly fixed to flexible member 39, either a cable or chain. The ends of this cable or chain are secured to a drum 40, in such a manner as to cause the end portions of the cable to simultaneously wind onto or unwind from said drum, as the latter is rotated.

This drum 40 is carried by a shaft 41 that is suitably mounted for rotation within the cabin of the plane and the upper end of said shaft carrying a hand wheel 42. Separate cables 39 pass around pulleys 43 located on the wings of the plane and arranged so that the yokes 38 that are secured to the cables, project at right angles therefrom with the pins 37, positioned in groove 36.

As a result of the construction just described, the driver of the plane may render the blade carrying shafts 32, operative or inoperative at will and to accomplish these results, drum 40 is rotated in one direction or the other, thereby simultaneously moving the yokes 38 so as to shift the gear wheels 29 into or out of engagement with the pinions 28, which latter are carried by the propeller shafts 27.

In order to equalize the operation of the blade carrying shafts 32 and enable the same to continue to function in the event that either one of the engines ceases to function, a shaft 44 mounted for operation in suitable bearings passes through or across the fuselage of the plane and the ends of this shaft extend into the housings 33 adjacent at points approximately midway between their ends.

The ends of this shaft within the housings carry beveled pinions 45 that mesh with pinions 46, the latter being secured on the central portions of the blade carrying shafts 32. (See Fig. 10.)

Thus, if either engine fails to function, the shaft 44 and its connections with the blade carrying shafts 32 will transmit motion from the blade carrying shaft 32 that is associated with the engine that is functioning properly, to the blade carrying shaft that is associated with the engine that has ceased or partially ceased to function.

In some instances a cable or chain operating over pulleys or sprocket wheels may be utilized in the place of the shaft 44 as the driving means between the blade carrying shafts 32.

Thus it will be seen that we have provided safety apparatus for air planes that is relatively simple in construction, inexpensive of manufacture, and very effective in performing the functions for which it is intended.

The blades 25 operating at high speed within the substantially cylindrical housings 14 impinge on the air as said blades pass through the openings 15 on the outer sides of said housings, thus producing a lifting effect that is especially advantageous while the equipped plane is taking off, while landing and during sustained flight. By changing the angular positions of the blades that are carried by the adjustable sleeves, said blade will impinge the air so as to exert driving effect on the plane and thereby increase its normal speed.

On those planes utilized for the transportation of a number of passengers and for carrying loads of considerable weight, the sleeves that carry the sets of blades may be adjusted lengthwise upon their shafts, thus enabling proper longitudinal balance of the airplane to be accomplished.

It will be readily understood that minor changes on the size, form and construction of the various parts of our improved safety airplane may be made and substituted for those herein shown and described without departing from the spirit of our invention, the scope of which is set forth in the appended claims.

We claim as our invention:

1. The combination with an airplane, its wings, an engine driven propeller shaft, of housings mounted on top of said wings, which housings occupy positions parallel with the axis of the fuselage, both ends of each housing being open, there being a longitudinally disposed opening formed in the outer portion of each housing on the opposite side from the fuselage, which opening extends the entire length of said housing, a shaft mounted for rotation within and extending axially through each housing, a pair of sleeves mounted for longitudinal adjustment upon each shaft, rows of threaded stems screw seated in each sleeve, a lock nut on each stem, a blade carried by each stem, said stems and blades being disposed at right angles to the sleeves and driving connections between the propeller carrying shaft and the shafts that extend through said housings.

2. A safety airplane as set forth in claim 1, with manually operable means for rendering the driving connections between the propeller shaft and the shafts in said housings, operative or inoperative.

3. A safety airplane as set forth in claim 1 and with connections between the shafts in the housings whereby the same are caused to operate at the same speed in opposite directions.

4. A safety airplane as set forth in claim 1, with driving connections from the propeller shaft of the airplane to the shafts within said housings, manually operable means for rendering said driving connections operative or inoperative and connections between the shafts in the housings whereby the same are simultaneously rotated at the same speed in opposite directions.

5. The combination with an airplane and its wings, of substantially cylindrical housings mounted on top of said wings and disposed at right angles thereto, both ends of said housings being open and there being a longitudinally disposed opening formed in each housing on the opposite side from the fuselage, a shaft extending axially through each housing and mounted for rotation therein, sleeves mounted for independent longitudinal sliding movement on the end portions of said shaft, means for securing each sleeve to the shaft in differently adjusted positions, two rows of threaded stems screw seated in each sleeve, the stems of one row being disposed diametrically opposite the stems of the other row, lock nuts seated on said stems and a blade carried by each threaded stem, the lengths of which threaded stems and blades are such that the outer ends of said blades travel across the longitudinally disposed opening formed in the surrounding housing.

ALEXIS BISAILLON.
GEORGE E. BISAILLON.